Patented July 13, 1954

2,683,740

UNITED STATES PATENT OFFICE 2,683,740

2,2',2''-NITRILOTRIS(ETHYLIMINO-DIACETIC ACID)

Winfield Scott Worrall, Yellow Springs, Ohio, assignor to Monsanto Chemical Company, St. Louis, Mo., a corporation of Delaware No Drawing. Application October 24, 1952, Serial No. 316,778

4 Claims. (Cl. 260—534)

The present invention relates to nitrogenous polycarboxy compounds and to methods of producing the same.

According to the invention there is provided as a new composition of matter 2,2',2''-nitrilotris(ethyliminodiacetic acid) having the formula

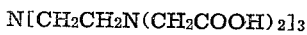

N[CH$_2$CH$_2$N(CH$_2$COOH)$_2$]$_3$

It is readily obtained by condensing tris(2-aminoethyl)amine with formaldehyde and a metal or ammonium cyanide. 2,2',2''-nitrilotris(ethyliminodiacetic acid) is a stable well-defined compound which may be employed for a variety of industrial purposes, e. g., as an intermediate in the preparation of plasticizers for synthetic resins, agricultural toxicants, and lubricant additives, but it is most useful as a sequestering agent. The new compound possesses a high degree of activity in sequestering alkaline earth metal ions in water and thus prevents formation of water insoluble alkaline earth metal salts in washing operations, during storage of liquid soap, etc.

It is felt that the unique symmetrical structure of tris(2-aminoethyl)amine contributes greatly to the sequestering activity of the polycarboxymethylated product. In contrast with other sequestering compounds containing more than two nitrogen atoms, the symmetrical structure enables the unshared electron pairs on all four of the nitrogen atoms to participate in the sequestering action.

Reaction of the tris(2-aminoethyl)amine with the metal cyanide and formaldehyde takes place easily by mixing the reactants, advantageously at increased temperatures and in the presence of water or an inert polar liquid as diluent, and in the presence or absence of an extraneous strongly alkaline agent to assure hydrolysis of the intermediately formed polynitrile. When operating in the absence of such an extraneous agent the product is a polynitrile which must be subsequently hydrolyzed to the nitrilohexaacetic compound, whereby a two-step process is involved. When using a strongly alkaline agent in the initial reaction mixture, hydrolysis of the intermediately formed polynitrile occurs during the condensation reaction. As alkaline nitrile-hydrolyzing agents in the one-step process, there may be used any inorganic strongly basic materials such as the alkali metal hydroxides. In the two-step process, the nitrile-hydrolyzing agent may be acidic or basic as may be apparent to those skilled in the art. Cyanides which may be used include any metal cyanide such for example as sodium, potassium, lithium and ammonium cyanide.

In order to assure complete carboxymethylation of the tris(2-aminoethyl)amine, the gradual alternate introduction of formaldehyde and cyanide into the polyamine is recommended. The resulting reaction product generally comprises the alkali metal or ammonium salt of the 2,2',2''-nitrilotris(ethyliminodiacetic acid), reaction diluent, if any, and unreacted initial material. The carboxymethylated product may be recovered by usual isolating and purifying procedures.

The invention is further illustrated, but not limited, by the following examples:

Example 1

A strongly alkaline solution of tris(2-aminoethyl)amine was prepared by dissolving 25.6 g. of the hydrochloride of the amine and 14.4 g. of sodium hydroxide in 60 ml. of water. This solution was labeled (A). An aqueous sodium cyanide solution, labeled (B), was prepared by dissolving 29 g. of sodium cyanide in 69 ml. of water. The solution (A) was heated to refluxing and to the refluxing solution there was added dropwise and alternately the cyanide solution (B) and 36 per cent aqueous formaldehyde over a period of about 7 hours and in the following sequence:

1. 17 ml. (B)
2. 8.4 ml. HCHO
3. 17 ml. (B)
4. 8.99 ml. HCHO
5. 17 ml. (B)
6. 8.99 ml. HCHO
7. 17 ml. (B)
8. 8.99 ml. HCHO
9. 17 ml. (B)
10. 9.54 ml. HCHO

Refluxing of the entire mixture was conducted for an additional two hours. The resulting clear yellow solution containing a very small quantity of a white precipitate was filtered to remove the latter and the filtrate, comprising an aqueous solution of 2,2',2''-nitrilotris(ethyliminodiacetic acid) was set aside for testing of sequestering activity.

Example 2

Sequestering efficiency of the aqueous solution of 2,2',2''-nitrilotris(ethyliminodiacetic acid) obtained in Example 1 was demonstrated by employing the following testing procedure:

Based on the reactants employed, the aqueous solution contained a 28.9 per cent concentration of 2,2',2''-nitrilotris(ethyliminodiacetic acid). This solution was further diluted with distilled water to give a 10 per cent solution, and 10 ml. of 5 per cent aqueous ammonium oxalate indicator was added to the diluted solution. The whole was then titrated at room temperature (26° C.) with 0.5 M calcium chloride solution until the first detectable permanent turbidity was observed. The grams of calcium carbonate sequestered per 100 g. of the agent were then calculated from the observed reading. Employing this testing procedure, there was determined a sequestering activity of 15.0 g. $CaCO_3$/100 g. of the 2,2',2''-nitrilotris(ethyliminodiacetic acid). The similarly obtained value for tetrasodium pyrophosphate, a standard sequestering agent, is 5.0 g.

What I claim is:

1. 2,2',2''-nitrilotris(ethyliminodiacetic acid).
2. The method of preparing 2,2',2''-nitrilotris-(ethyliminodiacetic acid) which comprises heating tris(2-aminoethyl)amine with formaldehyde and a metal cyanide.
3. The method of preparing 2,2',2''-nitrilotris-(ethyliminodiacetic acid) which comprises refluxing tris(2-aminoethyl)amine with formaldehyde and sodium cyanide.
4. The method of preparing 2,2',2''-nitrilotris-(ethyliminodiacetic acid) which comprises alternately adding an aqueous solution of sodium cyanide and an aqueous solution of formaldehyde to a refluxing aqueous solution of tris(2-aminoethyl)amine.

References Cited in the file of this patent

UNITED STATES PATENTS

| Number | Name | Date |
|--------|------|------|
| 2,564,092 | Bersworth | Aug. 14, 1951 |